US008140597B2

(12) United States Patent
DeVal et al.

(10) Patent No.: US 8,140,597 B2
(45) Date of Patent: Mar. 20, 2012

(54) COMPUTER SYSTEM MEMORY MANAGEMENT

(75) Inventors: Gary John DeVal, Raleigh, NC (US); Michael Stephen Fulton, British Columbia (CA); Curtis E. Hrischuk, Holly Springs, NC (US); Ryan Andrew Sciampacone, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 11/846,594

(22) Filed: Aug. 29, 2007

(65) Prior Publication Data
US 2009/0063594 A1 Mar. 5, 2009

(51) Int. Cl.
*G06F 17/30* (2006.01)

(52) U.S. Cl. ........ 707/813; 707/814; 707/815; 718/106; 711/170; 719/328

(58) Field of Classification Search .................. 707/813, 707/814, 815; 718/106; 711/170; 719/328
See application file for complete search history.

(56) References Cited

U.S. PATENT DOCUMENTS

| | | | | | |
|---|---|---|---|---|---|
| 5,088,036 | A * | 2/1992 | Ellis et al. | ............................... | 1/1 |
| 5,485,613 | A * | 1/1996 | Engelstad et al. | ............. | 707/206 |
| 5,842,016 | A * | 11/1998 | Toutonghi et al. | ............. | 718/106 |
| 6,304,949 | B1 * | 10/2001 | Houlsdworth | ................ | 711/170 |
| 6,341,293 | B1 * | 1/2002 | Hennessey | ............................. | 1/1 |
| 6,349,312 | B1 * | 2/2002 | Fresko et al. | ......................... | 1/1 |
| 6,353,838 | B2 * | 3/2002 | Sauntry et al. | ......................... | 1/1 |
| 6,490,597 | B1 * | 12/2002 | Singh et al. | .................... | 707/204 |
| 6,490,599 | B2 * | 12/2002 | Kolodner et al. | ..................... | 1/1 |
| 6,671,707 | B1 * | 12/2003 | Hudson et al. | ........................ | 1/1 |
| 6,978,285 | B2 * | 12/2005 | Li | ......................................... | 1/1 |
| 7,058,670 | B2 * | 6/2006 | Garthwaite | .................... | 707/815 |
| 7,107,426 | B2 * | 9/2006 | Kolodner et al. | ............. | 711/170 |
| 7,418,718 | B2 * | 8/2008 | Liu et al. | ........................ | 719/328 |
| 7,672,983 | B2 * | 3/2010 | Printezis et al. | .............. | 707/813 |
| 7,991,808 | B2 * | 8/2011 | Garst et al. | ...................... | 707/820 |
| 2002/0073110 | A1 * | 6/2002 | Duvillier et al. | .............. | 707/206 |
| 2002/0087590 | A1 * | 7/2002 | Bacon et al. | ................... | 707/206 |
| 2003/0172094 | A1 * | 9/2003 | Lauria et al. | ................... | 707/206 |
| 2004/0111451 | A1 * | 6/2004 | Garthwaite | ................... | 707/206 |
| 2004/0181562 | A1 * | 9/2004 | Findeisen | ..................... | 707/206 |
| 2006/0075007 | A1 * | 4/2006 | Anderson et al. | ............. | 707/206 |
| 2007/0185943 | A1 * | 8/2007 | Bacon et al. | .................. | 707/206 |

\* cited by examiner

*Primary Examiner* — Frantz Coby

(57) ABSTRACT

The number of CPU cycles required to reclaim object memory space in a memory management process is reduced by using a two phase approach. A data structure exists for each object that is to be loaded into object memory space. One part of the data structure is the object definition. The other part is a MM (Memory Management) immunity annotation or value that controls the frequency with which the object must actually be examined to determine if it is suitable for reclamation. On each iteration of the memory management process, the object's MM immunity value is tested to determine whether it is greater than a predetermined threshold. If greater than the threshold, the value is decremented, but the object is not actually examined for its suitability for removal. If the value equals the threshold, the object itself is examined. If it is found to be suitable, it is removed to reclaim the object memory space it previously occupied, If it is actually examined but is found not to be suitable for removal, the MM immunity value is reset to its original value or is otherwise adjusted to prevent examination of the object for a certain number of future iterations of the memory management process.

12 Claims, 7 Drawing Sheets

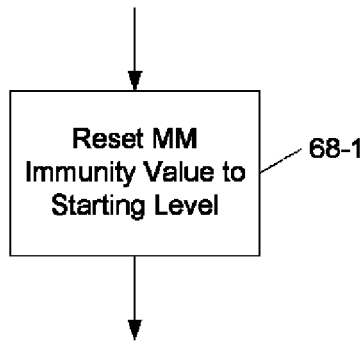
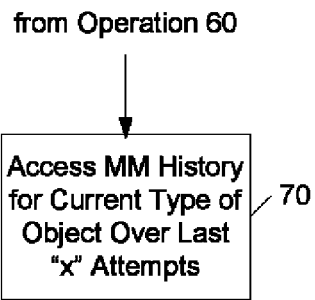
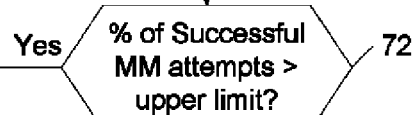
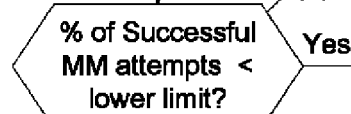
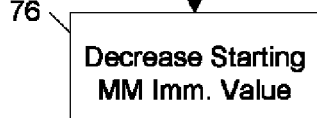
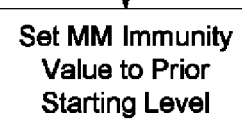
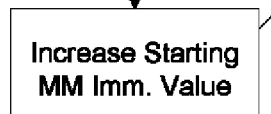
FIG. 7
FIG. 8

COMPUTER SYSTEM MEMORY MANAGEMENT

BACKGROUND OF THE INVENTION

The present invention relates to management of computer system memory space and more particularly to efficient use of CPU cycles in reclamation of computer memory space using an improvement in automatic memory management (sometimes called garbage collection) technology.

When computer programs are running or executing in a computer system, the computer system must allocate memory space, usually RAM (Random Access Memory) space, to hold objects required by those programs. The term "object" is a generic one and can refer to any data structure required by running programs. Examples of objects include, but are not limited to data structures defining instructions, numeric data, images, or, in object-oriented programming, a concrete instance of a class that consists of data and operations associated with that data.

Memory locations allocated to object storage are sometimes referred to as a "heap space" or simply a "heap", terms that will be used frequently in the following description.

If objects loaded into a heap are never removed, the heap space can be exhausted and unavailable for new objects required by running programs. If that happens, it can be expected that the program requiring those new objects will fail somehow, perhaps generating unintended results while continuing to run or simply failing to run, a condition sometimes referred to as a program crash.

To reduce the possibility that heap space will become exhausted, automatic memory management technology has been developed. In simple terms, a automatic memory management program periodically examines objects stored in the heap to determine whether those objects are still needed by running programs. If the memory management program decides that an object is no longer needed, the memory space allocated to that object is reclaimed, making the freed space available for new objects. Typically, a memory management program also defragments the heap by packing the remaining objects into contiguous memory space, thus freeing up a greater amount of contiguous memory space for new objects.

BRIEF SUMMARY OF THE INVENTION

The present invention is an improvement in automatic memory management technology that may be embodied as a method for removing an object stored in computer memory. An annotation associated with the object is examined. If the examined annotation satisfies predetermined criteria, then the object itself is examined to determine its suitability for removal from computer memory.

The invention may also be embodied as a computer program product for removing an object from computer memory. The computer program product includes a computer usable medium embodying computer usable program code. The embodied code includes program code that is configured to examine an annotation associated with an object stored in computer memory. If this program code determines that the annotation satisfies predetermined criteria, other program code examines the object to determine its suitability for removal from computer memory.

The invention may be embodied as a memory management system. The system includes logic for examining an annotation associated with an object stored in computer memory. If the examined annotation satisfies predetermined criteria, memory management logic is called to examine the object itself to determine its suitability for removal from computer memory.

In another embodiment, the invention may be characterized as a method for controlling the likelihood that an object will be removed from computer memory during execution of a memory management operation. In this embodiment, the method is performed when the object is created. The object is examined to assess the likelihood that it would actually be removed from memory as the result of a memory management operation. The object is then annotated to alter that likelihood.

Finally, the invention may be embodied as an object data structure that includes both data defining the object and an associated annotation that controls the likelihood that the defined object, once loaded into computer memory, will actually be removed from memory in the course of a subsequent memory management operation.

BRIEF DESCRIPTION OF THE SEVERAL VIEWS OF THE DRAWINGS

FIG. 7 represents a specific implementation of a specific step shown generally in the flowchart of FIG. 6.

FIG. 8 represents an alternate implementation of the same specific step shown generally in the flowchart of FIG. 6.

DETAILED DESCRIPTION OF THE INVENTION

Figure 1:
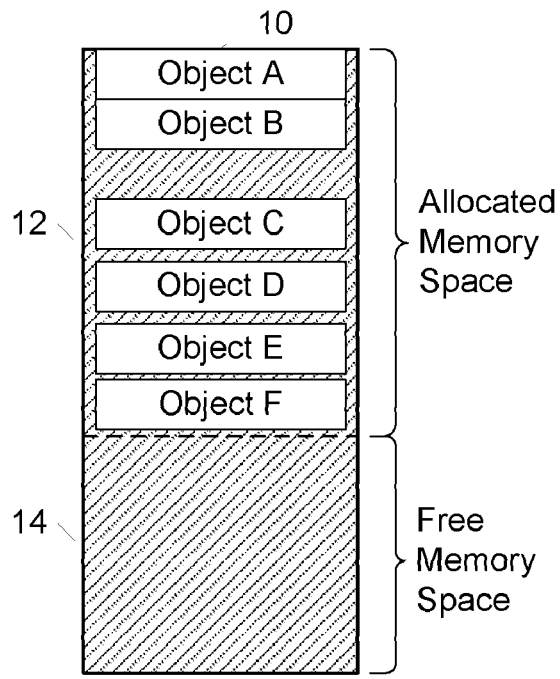
FIG. 1 is a graphical representation of a computer memory or heap space prior to performance of a memory management operation.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, the drawing illustrates a section of a heap space 10, computer system memory in which objects required by a computer program during its execution are stored. For the sake of simplicity, only six objects (Object A-Object F) are shown stored in allocated memory space 12 in the heap space 10. In reality, thousands of objects may be stored in the heap space at a given time.

It will be noted that not all of the allocated memory space is actually occupied by objects. If the heap space allocated previously to a large object is later reallocated to a smaller object, parts of that heap space will remain unused. If subsequent objects are too large to make use of the unused space, the heap space will eventually include many of these small unusable memory fragments. Such memory fragments, while not actually occupied, are considered part of the allocated memory space 12 in heap space 10 rather than free memory space 14 available for new objects.

The basic purpose of a memory management operation is to examine objects stored in the heap space to determine whether those objects may be needed by any of the computer programs that are running in the computer system at the time. Any object that may be needed by a running program is said to be reachable by that program and is not ordinarily removed from the heap space in the course of a memory management operation. Algorithms for determining whether an object is reachable or unreachable are well known in the art. The details of such algorithms are not discussed here as they are not important to an understanding of the present invention.

While this description speaks in terms of removing objects from heap space, it should be understood that such terminology does not imply that physical objects are somehow physically removed from computer memory space. What actually happens is that the computer memory locations occupied by a collected object are reclaimed by designating those locations as being available for new object data.

Figure 2:
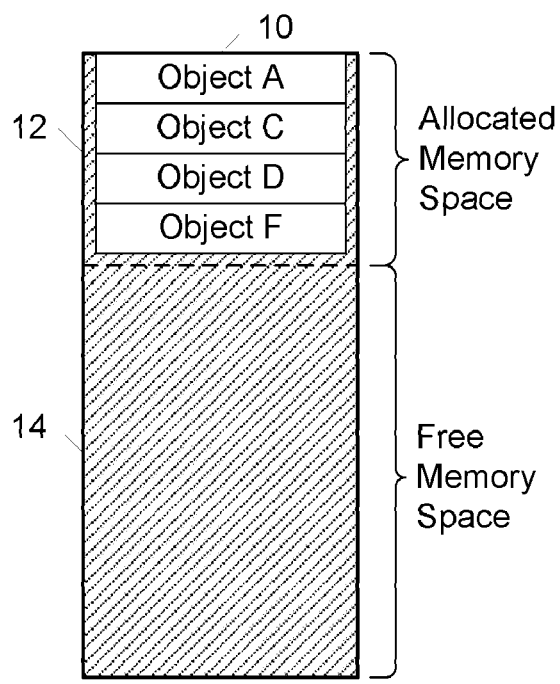
FIG. 2 is a graphical representation of the same computer memory or heap space following performance of a memory management operation.

FIG. 2 is a representation of heap space 10 following completion of a memory management operation. Objects B and E are presumed to have been found unreachable in the prior memory management operation, allowing heap memory previously allocated to those objects to be reclaimed. The remaining Objects A, C, D and F have been relocated to eliminate any memory fragments previously found in the allocated memory space 12. As a result of the memory management operation, a smaller portion of the heap 10 is actually allocated to object storage, creating more free memory space 14 that is available to new objects.

Figure 3:
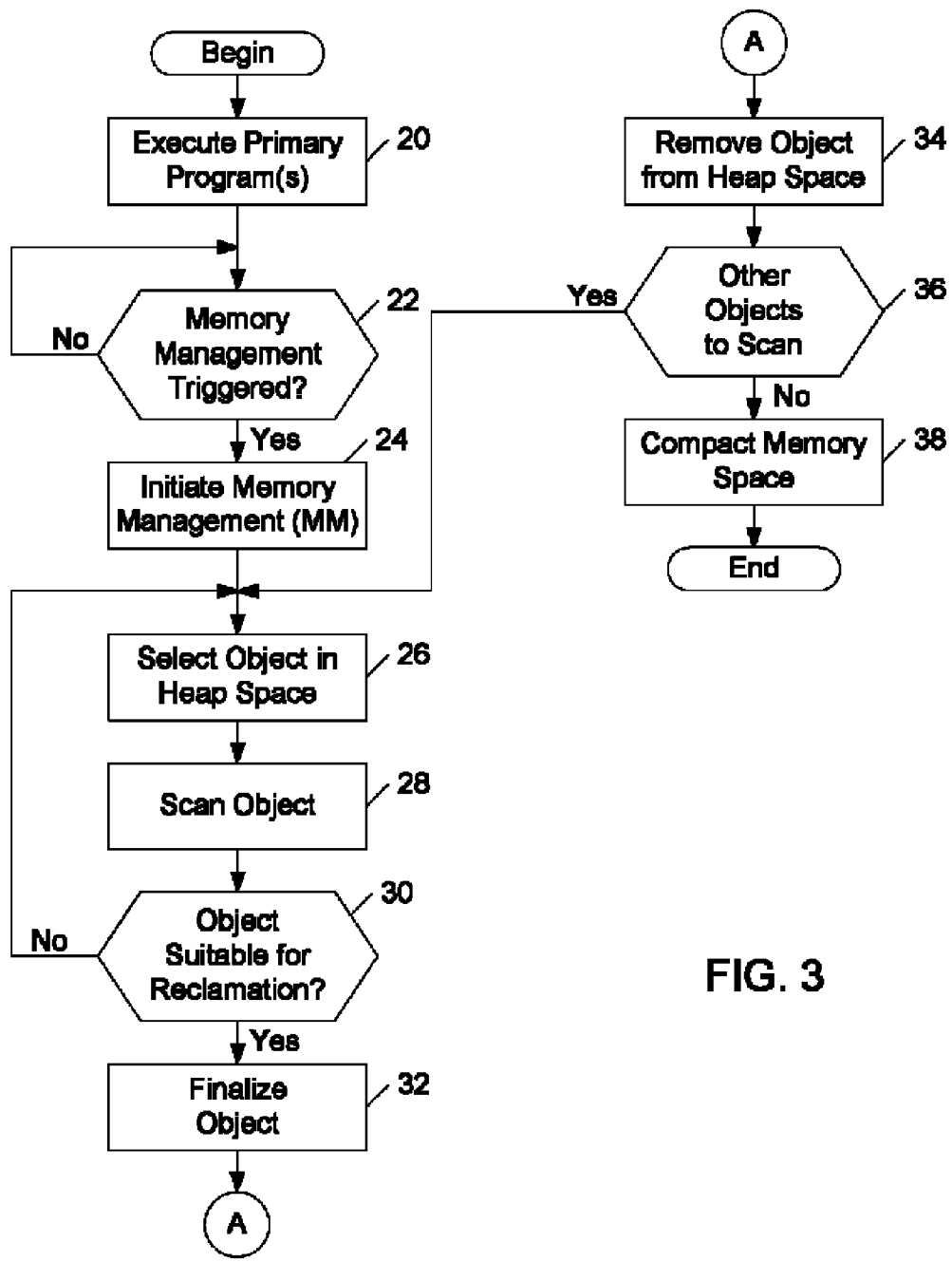
FIG. 3 is a flow chart representing a basic memory management operation.

FIG. 3 is a flow chart of the basics of a memory management program. It is assumed that one or more programs have been running (operation 20) before a memory management operation is triggered in step 22. A memory management operation can be triggered in different ways. In one type of system, memory management is not actually triggered until the heap space is exhausted and no new objects can be loaded. In this type of system, execution of the primary programs is suspended while memory management is performed. In another type of system, memory management is performed on an as-you-go basis without suspending execution of the primary programs. Details of the latter type of system are provided later with reference to the drawings.

The actual memory management operation is initiated in step 24. An object stored in the heap space is selected in step 26 and scanned in step 28. A determination is made in step 30 as to whether or not the object is suitable for reclamation; that is, whether the object can no longer be reached by any of the currently executing programs. If it is determined that the object is no longer needed by any of the currently executing programs, a finalization operation is performed in step 32. Details of the finalization operation are not provided as they are not needed for an understanding of the present invention.

Following finalization, the object is removed in an operation 34 that, as noted earlier, may amount to nothing more than marking the heap space occupied by the object as being available for new objects.

A decision 36 is then made as to whether there are other objects in the heap space on which memory management has yet to be performed. If there are, program control returns to the input of operation 26 in which the new object is selected and the previously described memory management steps are repeated.

Once the decision operation 36 shows that all of the objects in the heap space have been considered for reclamation, the heap space is defragmented or compacted in an operation 38 by relocating the objects remaining in the heap space into contiguous memory spaces, eliminating unusable memory fragments from the allocated heap space. Memory management is considered to be completed once the allocated memory space is compacted.

In the type of system just described, memory management may be deferred until the heap space is exhausted. In this type of system, execution of the object-using programs is interrupted while memory management is performed. In a multithreaded system, it may not be necessary to interrupt program execution.

Figure 4:
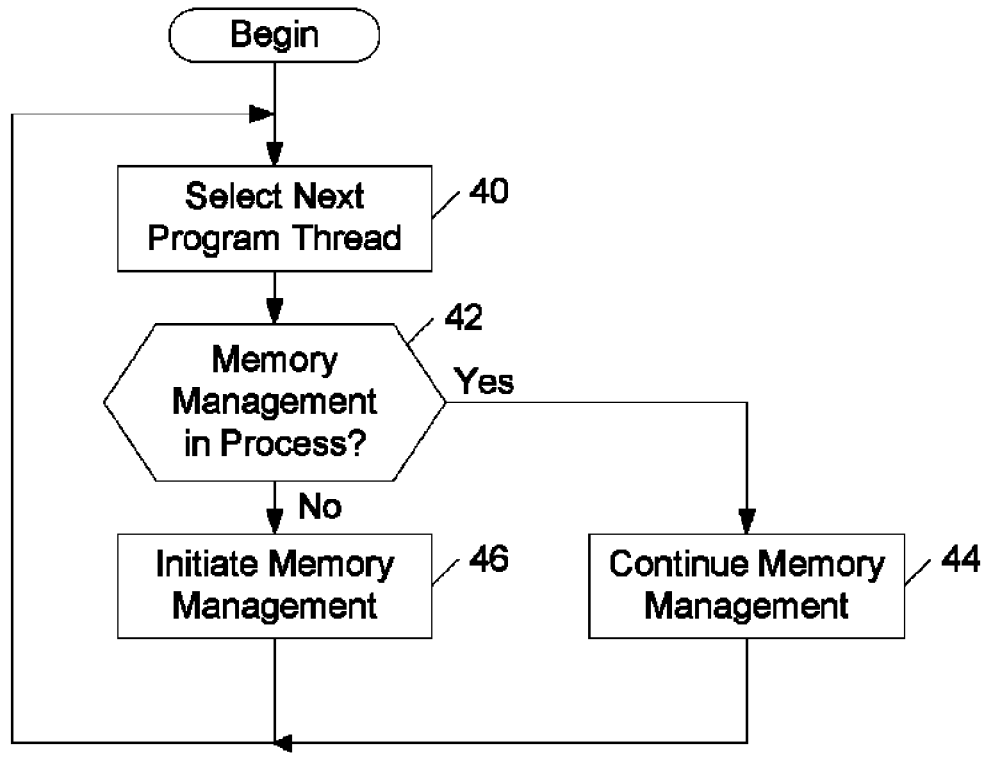
FIG. 4 is a flow chart representing a preferred form of a memory management system in which the present invention may be implemented.
Figure 5:
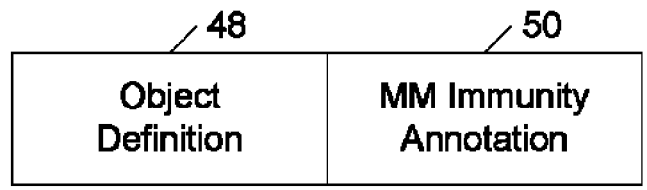
FIG. 5 is a schematic representation of a data structure that is used in implementing the present invention.

FIG. 4 is a flow chart illustrating how memory management may be performed in a multithreaded system. In such a system, a memory management algorithm runs on a high priority thread, context switching in and using CPU cycles at a predetermined rate to perform memory management activity on an as-you-go basis. Memory management activity is initiated when the thread selected in operation 40 is the thread assigned to the memory management algorithm.

Once the memory management thread has been selected, a determination 42 is made as to whether memory management operations are already underway in the thread. If memory management is already underway, it is continued for the allotted number of CPU cycles before the next program thread is selected. If step 42 shows that no memory management operations are currently underway, the operations are initiated in step 46 and are continued for the allotted number of CPU cycles.

One thing that should be noted in the foregoing descriptions is that every object loaded into heap space is scanned or examined to determine whether it is suitable for memory management. The present invention stemmed from a realization that it can be very time consuming and unproductive to scan every object in heap space to determine whether it is suitable for memory management.

Certain types of objects have little or no chance of being garbage collected in any given memory management operation. Certain objects (that is, "immortal" objects) must remain reachable for the entire life of the program using them. Other objects, while perhaps not immortal, are likely to have life spans much longer than the interval between typical automatic memory management operations. Typically, automatic memory management is performed at intervals of less than a minute. In a typical SIP (Session Initiation Protocol) operation, tens of thousands of stored objects may be needed during a session lasting several minutes. If memory management is performed during such a SIP session, a considerable number of CPU cycles will be wasted examining objects that are highly unlikely to be suitable for reclamation for at least several iterations of the memory management process.

To avoid wasting CPU cycles during automatic memory management operations, the present invention allows objects to be annotated with a MM (Memory Management) immunity value that controls the likelihood that the annotated object will actually be removed from memory during an automatic memory management operation. FIG. 4 shows a simple data structure that supports this annotation. The object itself is defined in a field 48. A second field 50 stores a MM immunity annotation or value that, in one embodiment of the invention, may be an integer value, the magnitude of which is inversely proportional to the likelihood that the defined object would actually be collected during the next memory management operation.

The creator of the object may assign the integer value as part of the object creation process using the creator's knowledge of the expected lifetime of the object. Alternatively, a profiling tool could automatically assign the integer value based on profiling one or more benchmark executions of the application, from production systems. Another option is that the automatic memory management log files could expose some of this information, which an analysis program could process to determine the integer value.

Figure 6:
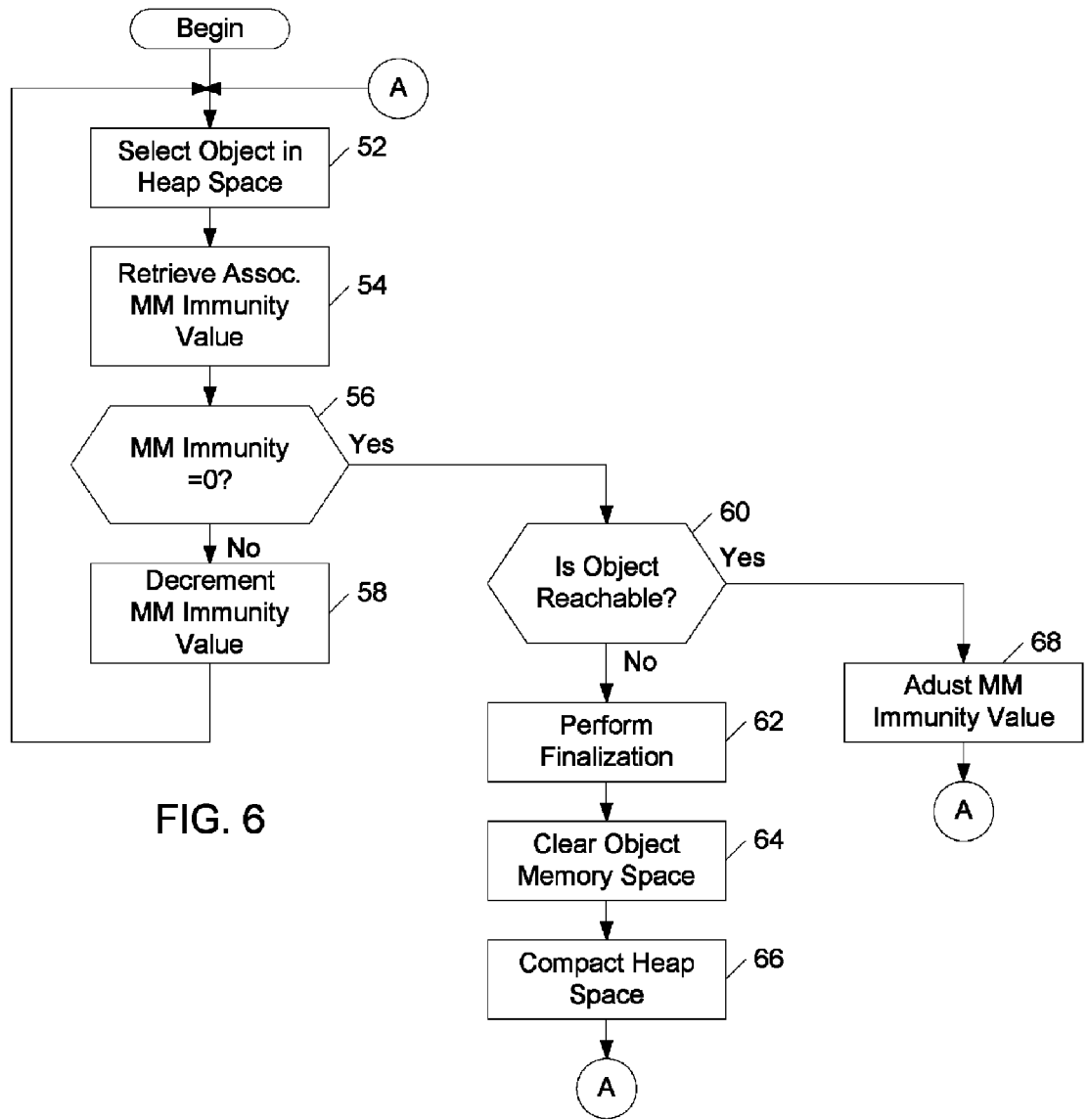
FIG. 6 is a flow chart representing operations performed in an implementation of the present invention.

FIG. 6 is a flow chart of what might be described as a two phase process for using the MM immunity value in performing a highly efficient memory management operation. The flowchart assumes that the memory management process has already been initiated. An object stored in the heap space is selected in step 52. The MM (memory management) immunity value associated with that object is retrieved in an operation 54. As noted earlier, the MM immunity value may be a positive integer having a magnitude inversely proportional to the likelihood that the object would be successfully collected. Once the MM immunity value is retrieved, it is tested in operation 56 to determine whether it is equal to zero. If the MM immunity value is not equal to zero, meaning that it is an integer value greater than zero, the value is decremented and the program returns to the input of operation 52 where the next object in the heap space is selected.

In the situation described above, no CPU cycles are spent on actually examining the object to determine whether it is suitable for removal; i.e., whether it is reachable by any currently executing program. The only time an object is examined to determine whether it is suitable for removal is where operation 56 indicates the current MM immunity value for the object is equal to zero. In that case, an operation 60 is conducted to determine whether the object is suitable for removal. If operation 60 shows that the object is not reachable by any of the currently executing programs, a finalization operation 62 is performed on the object before the memory space currently occupied by the object is cleared in operation 64. An operation 66 may be performed to compact or defragment in the heap space either as each object is removed or when it is determined that all objects currently in the heap space have been considered. While the drawing shows that a compaction or defragmentation operation is performed on each MM cycle, the system designer may decide that is unnecessary and elect to have compaction performed less often.

If operations 56 and 60 had shown that the object needed to be considered for reclamation but was then found not to be suitable (i.e., the object was still needed by currently executing programs), the MM immunity value associated with the object is preferably adjusted in an operation 68. Different types of value adjustments can be made. These are described in more detail later.

The effect of the above-described process is to considerably reduce the number of times that objects stored in heap space must be actually be examined to determine whether they are suitable for reclamation. Reducing the number of objects that are actually examined greatly reduces the number of CPU cycles required for the overall memory management process.

As a specific example, assume that an initial MM immunity value of 5 had initially been associated with an object. During the first four iterations of a memory management operation, operations 52, 54 and 56 would cause the MM immunity value associated with the object to be retrieved and compared to zero. During each of these iterations, the MM immunity value would still be greater than zero. In each iteration, operation 58 would cause the MM immunity value to be decremented by one but the object itself would not actually be examined.

On the fifth iteration, operation 56 would show that the MM immunity value had been decremented to zero, finally resulting in an examination of the object to determine its suitability for reclamation. Thus, on four out of five memory management cycles, no time would be spent actually examining the object, leading to a considerable saving in CPU cycles.

As noted earlier, the MM immunity value is adjusted in an operation 68 if the MM immunity value is found to be equal to zero but it is determined that the object is not actually suitable for memory management. In one embodiment, illustrated in FIG. 7, the adjustment may be limited to resetting the MM immunity value associated with the object to its original or starting level in operation 68-1. In the example given above, the immunity value would be reset to 5, meaning the object would not again be actually examined during the next four iterations of the memory management process.

In a more complex embodiment illustrated in FIG. 8 as operation 68-2, a more autonomic approach can be used in adjusting the MM immunity value. A history of memory management attempts for the current type of object is accessed in operation 70 to determine how many times that type of object has been successfully collected the last "x" number of times it was actually examined for suitability for collection. The value of "x" is something that would be chosen by the program developer but would have to be high enough to establish a statistically valid sample.

A first test 72 would be made to determine whether the percentage of successful reclamation attempts exceeded a predetermined upper limit. A finding that the upper limit has been exceeded means the object should probably be examined more frequently to determine its suitability for reclamation. Such a finding would invoke an operation 76 in which a new, lower starting level would be associated with the object, causing it to be more frequently examined, during iterations of the memory management process.

If test 72 shows that the percentage of successful memory management attempts is below the predefined upper limit, a second test 74 is conducted to determine whether the percentage of successful memory managements is actually below a predetermined lower limit, meaning that the object probably does not need to be examined as frequently for suitability for reclamation. If the percentage of successful reclamation attempts is below the lower limit, an operation 80 will increase the starting level of the MM immunity value, causing the object to be examined less frequently.

Finally, if tests 72 and 74 show that the percentage of successful reclamation attempts is somewhere between the upper and lower limits, the immunity value is set to the last starting level in an operation 86.

Figure 9:
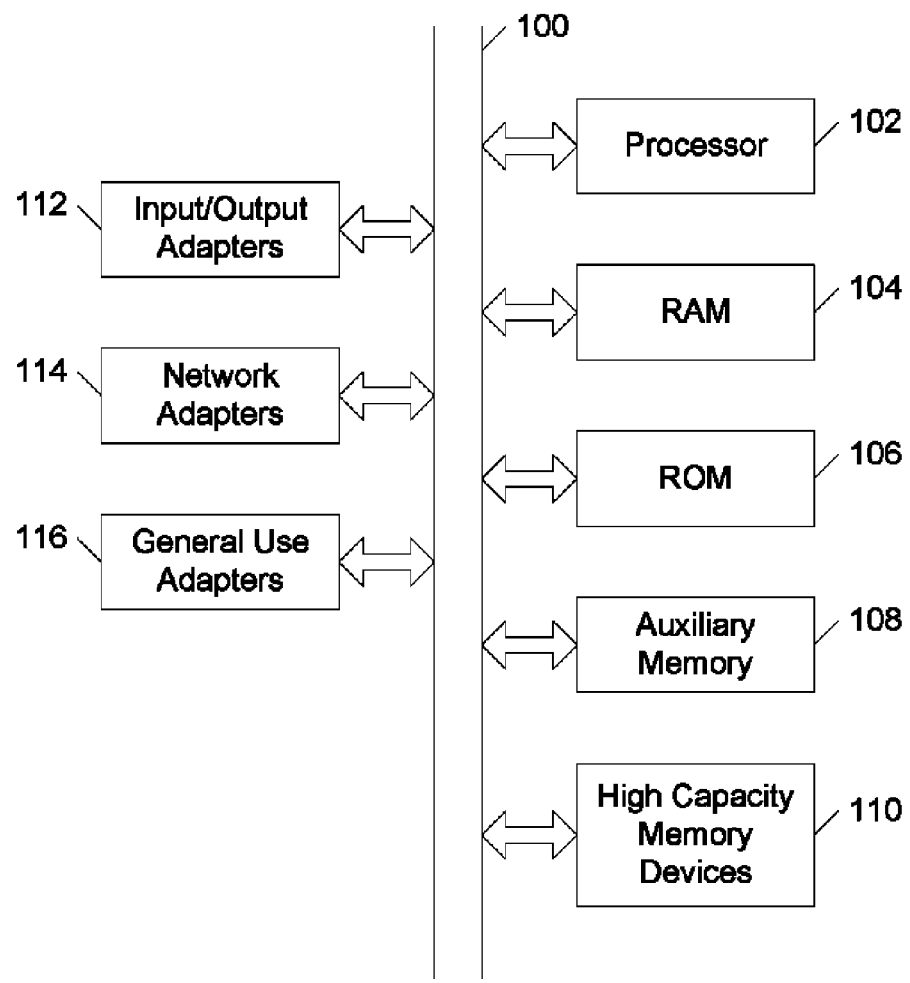
FIG. 9 is a schematic representation of the basic hardware elements of a general purpose computer system in which the present invention may be implemented.

The present invention may be implemented in a programmable general-purpose computer system of the type illustrated in FIG. 9. In such a system, a system bus 100 interconnects components such as processor 102, random-access memory (RAM) 104, read-only memory (ROM) 106, auxiliary memory 108 and high-capacity memory devices 110. Examples of high-capacity memory devices include but are not limited to magnetic hard drives and optical CD or DVD drives. Examples of auxiliary memory no way to include BIOS memory and flash memory keys. The general-purpose programmable system would also include input/output adapters 112 that are used to connect devices such as monitors, printers, keyboards, mice etc. to the computer system. Network adapters 114 would be used to connect the entire system to other computer systems. General adapters 116 include such things as USB and FireWire ports that can be used to connect many different types of input/output devices, memory devices and auxiliary devices (such as fingerprint scanners) to a computer system.

Figure 10:
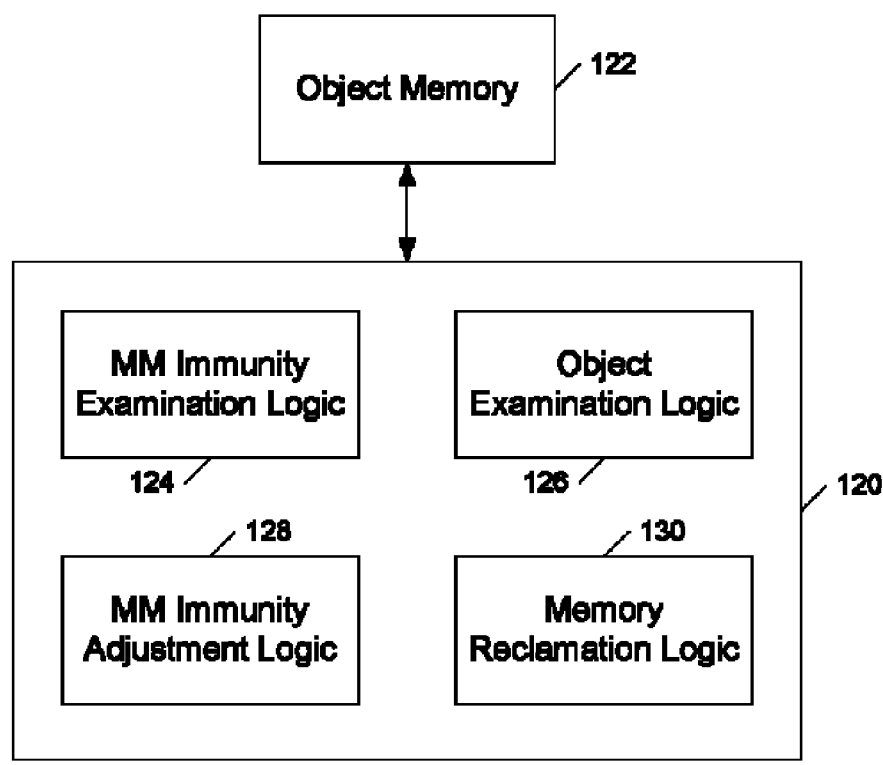
FIG. 10 is a schematic representation of the hardware elements of a special-purpose computer system for implementing the present invention.

Finally, the invention may also be implemented in a special-purpose computer system 120 as shown in FIG. 10 in which the functions described above are implemented in special-purpose logic modules under the control of the firmware or possibly hardwired logic. A special-purpose computer system connects to object memory 122 and includes a logic module 124 that examines the MM immunity value associated with a selected object and makes a determination whether the object itself needs to be examined. The actual examination of the object to determine its suitability for reclamation is handled by an object examination logic module 126. In the situation where an object is examined but found not to be suitable for reclamation, a logic module 128 controls any adjustment in the starting level of the MM immunity value associated with that object. Finally, memory reclamation logic 130 is used to control the compacting or defragmenting of the heap space either during memory management or once all memory management had been completed.

In the preceding description, the only discussed type of MM immunity value was an integer value and the only discussed test of suitability for reclamation was whether the object was reachable by any currently executing program. The invention may also be used for different types of immunity values and for different suitability tests. As a specific nonlimiting example, nonnumeric immunity values might be used to identify the type of memory (e.g., cache disk-backed, physical memory or virtual memory) in which an object is stored. Rules can be established that the frequency with which an object was to be examined for suitability for reclamation is dependent on the type of memory in which the object restored. For example, a rule might be established that virtual memory allocated to objects should be scanned only once a day. A system of this type and comparable systems are within the scope of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method for improving the efficiency of memory management operations performed on data objects stored in computer memory, the method comprising:
    selecting a data object;
    determining a numeric value of an annotation associated with said selected data object, said numeric value being indicative of the likelihood said selected data object would be removed from memory in a garbage collection operation;
    comparing said numeric value to a predetermined threshold value to determine if said numeric value has a predetermined relationship to said threshold value;
    if said numeric value has said predetermined relationship to said threshold value, immediately performing a garbage collection operation on said selected data object; and
    if said garbage collection operation indicates said selected data object may no longer be needed by a program executing on the computer, immediately removing said selected data object from memory.

2. A computer-implemented method according to claim 1 further comprising changing said numeric value after comparing it to said threshold value.

3. A computer-implemented method according to claim 2 wherein changing said numeric value after comparing it to said threshold value further comprises decreasing said numeric value.

4. A computer-implemented method according to claim 3 further comprising increasing said numeric value if an initiated garbage collection operation does not indicate said selected data object may no longer be needed by a program executing on the computer.

5. A computer program product for improving the efficiency of memory management operations performed on data objects stored in computer memory, said computer program product comprising a computer usable storage medium having computer usable program code stored thereon, said computer usable program code when loaded into and executed by a computer causing said computer to perform a method comprising:
    selecting a data object;
    determining a numeric value of an annotation associated with said selected data object, said numeric value being indicative of the likelihood said selected data object would be removed from memory in a garbage collection operation;
    comparing said numeric value to a predetermined threshold value to determine if said numeric value has a predetermined relationship to said threshold value;
    if said numeric value has said predetermined relationship to said threshold value, immediately performing a garbage collection operation on said selected data object; and
    if said garbage collection operation indicates said selected data object may no longer be needed by a program executing on the computer, immediately removing said selected data object from memory.

6. A computer program product according to claim 5 further comprising changing said numeric value after comparing it to said threshold value.

7. A computer program product according to claim 6 wherein changing said numeric value after comparing it to said threshold value further comprises decreasing said numeric value.

8. A computer program product according to claim 7 further comprising increasing said numeric value if an initiated garbage collection operation does not indicate said selected data object may no longer be needed by a program executing on the computer.

9. An efficient memory management computer system for selectively removing data objects stored in computer memory, said system including a processor and memory and further comprising:
    an object selection logic module for selecting a data object;
    an annotation examination logic module for determining a numeric value of an annotation associated with said selected data object, said numeric value being indicative of the likelihood said selected data object would be removed from memory in a garbage collection operation;
    a decision logic module for comparing said numeric value to a predetermined threshold value to determine whether said numeric value has a predetermined relationship to said threshold value;
    a garbage collection logic module for performing an immediate garbage collection operation on said selected data object only if said determined numeric value has said predetermined relationship to said threshold value; and
    a memory control logic module for removing said selected data object from memory only if said immediate garbage collection operation indicates said selected data object may no longer be needed by a program executing on the computer.

10. An efficient memory management computer system according to claim 9 further comprising an annotation control logic module for changing said numeric value after comparing it to said threshold value.

11. An efficient memory management computer system according to claim 10 wherein changing said numeric value after comparing it to said threshold value further comprises decreasing said numeric value.

12. An efficient memory management computer system according to claim 11 further comprising increasing said numeric value if an initiated garbage collection operation does not indicate said selected data object may no longer be needed by a program executing on the computer.

* * * * *